(12) United States Patent
Cutler (10) Patent No.: US 7,593,042 B2
(45) Date of Patent: Sep. 22, 2009

(54) MAINTENANCE OF PANORAMIC CAMERA ORIENTATION

(75) Inventor: Ross G. Cutler, Duval, WA (US)

(73) Assignee: Microsoft Corporation, Redmond, WA (US)

(*) Notice: Subject to any disclaimer, the term of this patent is extended or adjusted under 35 U.S.C. 154(b) by 637 days.

(21) Appl. No.: 11/027,163

(22) Filed: Dec. 31, 2004

(65) Prior Publication Data

US 2006/0023075 A1 Feb. 2, 2006

Related U.S. Application Data

(63) Continuation-in-part of application No. 10/902,675, filed on Jul. 28, 2004, now Pat. No. 7,495,694.

(51) Int. Cl.
*H04N 5/225* (2006.01)

(52) U.S. Cl. ............... 348/218.1; 348/14.08; 348/14.09; 348/36; 348/39; 352/69; 359/725

(58) Field of Classification Search ............. 348/218.1, 348/36; 359/725; 352/69
See application file for complete search history.

(56) References Cited

U.S. PATENT DOCUMENTS

| | | | |
|---|---|---|---|
| 3,118,340 A | 1/1964 | Iwerks et al. | |
| 4,504,857 A | 3/1985 | Miller et al. | |
| 4,706,119 A | 11/1987 | Shatto, Jr. et al. | |
| 5,539,483 A | 7/1996 | Nalwa | |
| 5,745,305 A | 4/1998 | Nalwa | |
| 5,793,527 A | 8/1998 | Nalwa | |
| 5,986,694 A * | 11/1999 | Iino | 348/135 |
| 5,990,934 A | 11/1999 | Nalwa | |
| 6,005,611 A | 12/1999 | Gullichsen et al. | |
| 6,011,558 A * | 1/2000 | Hsieh et al. | 345/629 |
| 6,111,702 A | 8/2000 | Nalwa | |
| 6,115,176 A | 9/2000 | Nalwa | |
| 6,128,143 A | 10/2000 | Nalwa | |
| 6,141,145 A | 10/2000 | Nalwa | |
| 6,144,501 A | 11/2000 | Nalwa | |
| 6,169,858 B1 | 1/2001 | Ray | |
| 6,195,204 B1 | 2/2001 | Nalwa | |
| 6,219,090 B1 | 4/2001 | Nalwa | |
| 6,285,365 B1 | 9/2001 | Nalwa | |
| 6,313,865 B1 | 11/2001 | Driscoll, Jr. et al. | |

(Continued)

FOREIGN PATENT DOCUMENTS

JP 1996125835 5/1996

(Continued)

OTHER PUBLICATIONS

Zicheng Liu and Michael Cohen, "Real-Time Warps for Improved Wide-Angle Viewing," Microsoft Research Technical Report MSR-TR-2002-110, Nov. 2002, United States.

*Primary Examiner*—Jason Chan
*Assistant Examiner*—Cynthia Calderon (57) ABSTRACT

Systems and methods for maintaining orientation of a non-cylindrical panorama is described wherein an initial magnetometer reading is obtained for a panoramic camera. If the panoramic camera is rotated from an initial position, a new magnetometer reading is obtained and a magnitude of rotation is determined. The magnitude of rotation is factored into an image stitching and warping process to create a panoramic image that maintains the initial orientation.

23 Claims, 6 Drawing Sheets

U.S. PATENT DOCUMENTS

| | | |
|---|---|---|
| 6,330,022 B1 * 12/2001 | Seligmann | 348/14.08 |
| 6,341,044 B1 1/2002 | Driscoll, Jr. et al. | |
| 6,346,967 B1 2/2002 | Gullichsen et al. | |
| 6,356,296 B1 3/2002 | Driscoll, Jr. et al. | |
| 6,356,397 B1 3/2002 | Nalwa | |
| 6,373,642 B1 4/2002 | Wallerstein et al. | |
| 6,388,820 B1 5/2002 | Wallerstein et al. | |
| 6,392,687 B1 5/2002 | Driscoll, Jr. et al. | |
| 6,424,377 B1 7/2002 | Driscoll, Jr. et al. | |
| 6,426,774 B1 7/2002 | Driscoll, Jr. et al. | |
| 6,459,451 B2 10/2002 | Driscoll, Jr. et al. | |
| 6,480,229 B1 11/2002 | Driscoll, Jr. et al. | |
| 6,489,992 B2 * 12/2002 | Savoye | 348/340 |
| 6,493,032 B1 12/2002 | Wallerstein et al. | |
| 6,515,696 B1 2/2003 | Driscoll, Jr. et al. | |
| 6,583,815 B1 6/2003 | Driscoll, Jr. et al. | |
| 6,593,969 B1 7/2003 | Driscoll, Jr. et al. | |
| 6,597,520 B2 7/2003 | Wallerstein et al. | |
| 6,700,711 B2 3/2004 | Nalwa | |
| 6,741,250 B1 5/2004 | Furlan et al. | |
| 6,756,888 B2 6/2004 | Su et al. | |
| 6,756,990 B2 6/2004 | Koller | |
| 6,885,509 B2 4/2005 | Wallerstein et al. | |
| 6,924,832 B1 8/2005 | Shiffer et al. | |
| 7,015,954 B1 * 3/2006 | Foote et al. | 348/218.1 |
| 7,020,337 B2 3/2006 | Viola et al. | |
| 7,031,499 B2 4/2006 | Viola et al. | |
| 7,099,510 B2 8/2006 | Jones et al. | |
| 7,197,186 B2 3/2007 | Jones et al. | |
| 7,212,651 B2 5/2007 | Viola et al. | |
| 2001/0010546 A1 * 8/2001 | Chen | 348/218 |
| 2002/0034020 A1 3/2002 | Wallerstein et al. | |
| 2002/0063802 A1 5/2002 | Gullichsen et al. | |
| 2002/0094132 A1 7/2002 | Hoffman et al. | |
| 2002/0154417 A1 10/2002 | Wallerstein et al. | |
| 2003/0193606 A1 10/2003 | Driscoll, Jr. et al. | |
| 2003/0193607 A1 10/2003 | Driscoll, Jr. et al. | |
| 2004/0008407 A1 1/2004 | Wallerstein et al. | |
| 2004/0021764 A1 2/2004 | Driscoll, Jr. et al. | |

FOREIGN PATENT DOCUMENTS

| | | |
|---|---|---|
| WO | WO 00/11512 | 3/2000 |
| WO | WO 2004/111689 | 12/2004 |
| WO | WO 2004/112290 | 12/2004 |
| WO | WO 2005/002201 | 1/2005 |

* cited by examiner

MAINTENANCE OF PANORAMIC CAMERA ORIENTATION

CROSS-REFERENCE(S) TO RELATED APPLICATION(S)

This application is a continuation-in-part of U.S. patent application Ser. No. 10/902,675, entitled "Omni-Directional Camera With Calibration And Up Look Angle Improvements", filed Jul. 28, 2004 by the present inventor and assigned to Microsoft Corp., the assignee of the present application. Priority is claimed to said application which is hereby incorporated by reference for all that it teaches and discloses.

TECHNICAL FIELD

The following description relates generally to image processing. More particularly, the following description relates to maintaining orientation of a panoramic camera system.

BACKGROUND

Panoramic video camera devices are configured to image wide angles of up to three hundred and sixty degrees (360°). These camera devices are especially useful in a conference room scenario, where meeting participants can be imaged no matter where they are located in the conference room. Special adjustments are made to provide a better image in certain conference room configurations, such as where meeting participants are seated around a rectangular table. If a camera device is moved after adjustments are made, the adjustments are rendered incorrect and the image becomes distorted.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present description describes one or more techniques and devices that maintain orientation of a panoramic camera device. Panoramic camera devices can provide cylindrical panoramic images or non-cylindrical panoramic images. A cylindrical panoramic image is an image that has uniform resolution across a span of the panorama. A non-cylindrical panoramic image is a panoramic image that has varying degrees of resolution across the span of the panorama.

When a panoramic camera device is configured to record a particular non-cylindrical configuration, a resultant image is distorted if the panoramic camera is moved from its initial orientation. In the following description, devices and techniques are described that record an initial orientation of a panoramic camera. If the panoramic camera is moved, the adjusted orientation of the camera is determined and the panoramic camera is configured to adjust a rendering of a panoramic image to account for the change in orientation.

Exemplary Configuration

Figure 1:
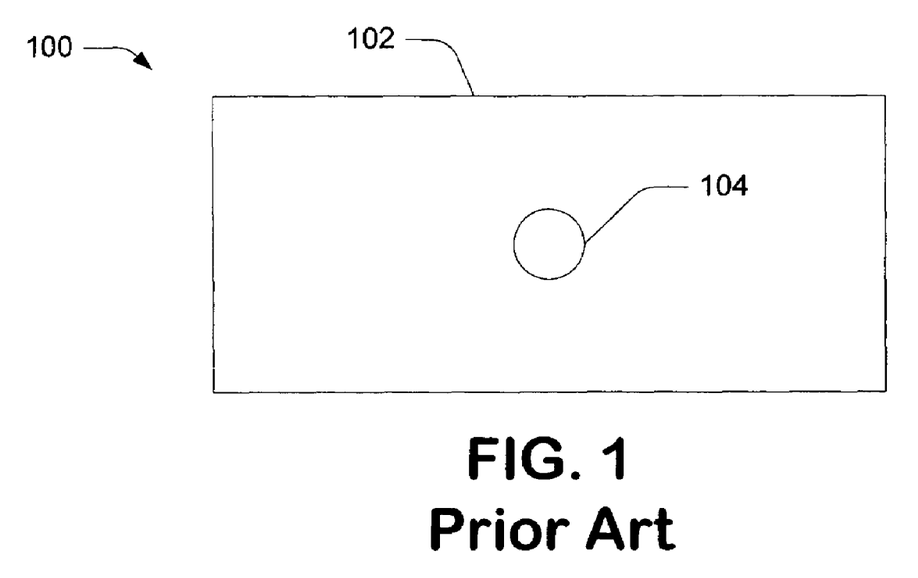
FIG. 1 is a diagram of a prior art conference room video configuration.

FIG. 1 is a diagram of a prior art conference room video configuration 100. The conference room video configuration includes a conference table 102 and a panoramic camera 104 situated atop the conference table 102. The panoramic camera 104 may be configured to record a non-cylindrical panoramic image.

Exemplary Cylindrical Panoramic Image

Figure 2:
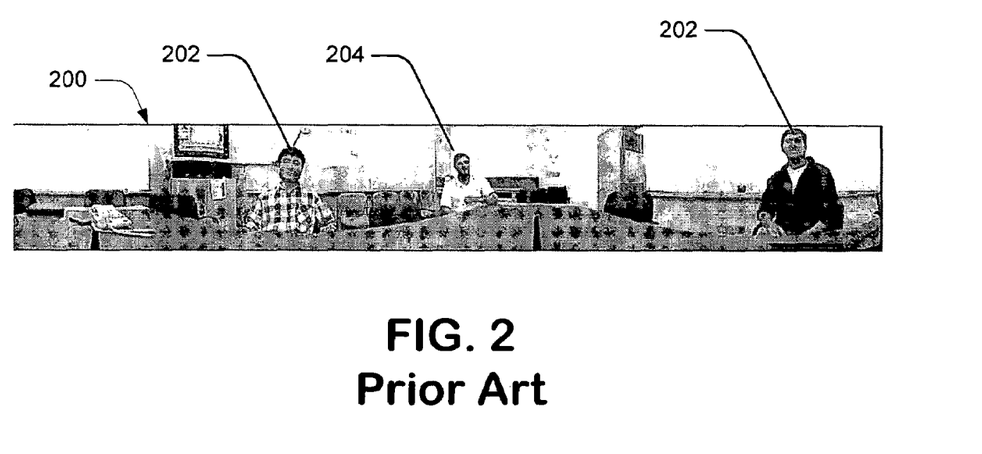
FIG. 2 is a depiction of an exemplary cylindrical panoramic image

FIG. 2 is a depiction of an exemplary cylindrical panoramic image 200. The cylindrical panoramic image 200 is taken from a panoramic camera device located in the center of a rectangular table that is ten feet long and five feet wide (10'× 5'). Since resolution is the same across the cylindrical panoramic image 200, an image of a face 202 of a person seated at the short side of the table (i.e. two and one-half feet (2.5°) from the camera) appears about twice as large as an image of a face 204 of a person seated at a long end of the table (i.e. five feet (5') from the camera).

Exemplary Non-Cylindrical Panoramic Image

Figure 3:
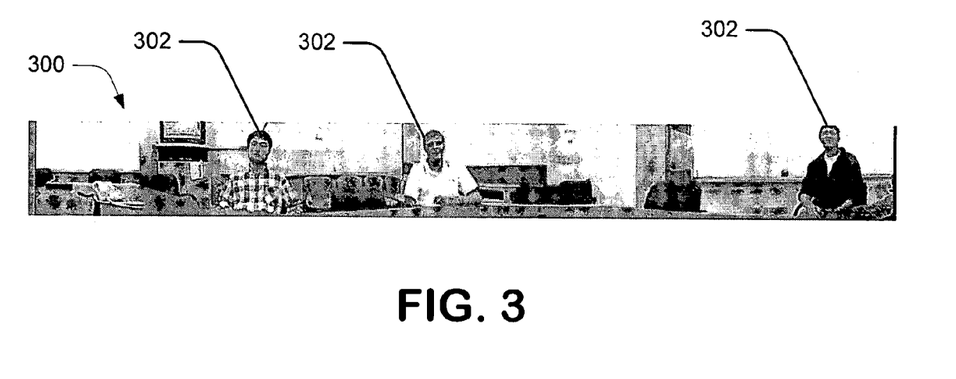
FIG. 3 is a depiction of a non-cylindrical panoramic image

FIG. 3 is a depiction of a non-cylindrical panoramic image 300. Like the image shown in FIG. 2, the non-cylindrical panoramic image 300 is taken from a panoramic camera device located in the center of a rectangular table that is ten feet long and five feet wide (10'×5'). In generating the non-cylindrical panoramic image 300, the panoramic camera normalizes the size of face images 302 so that they appear about equal.

Cylindrical panoramic cameras are radially symmetric and, therefore, the orientation of the camera with respect to a table on which is sits is not taken into account in processing a panoramic image. However, non-cylindrical panoramic cameras must be able to determine the orientation of the panoramic camera with respect to the table so that the different fields of resolution taken by the panoramic camera can be processed correctly.

For example, the non-cylindrical panoramic image 300 is oriented so that resolution is increased for far ends of the table. If a camera taking such an image was rotated ninety degrees (90°), then resolution of the near sides of the table is increased and resolution is decreased for far ends of the table. As a result, faces on the short sides of the table would appear approximately four times larger than faces on the long ends of the table.

However, if the camera was configured to track the ninety degree (90°) rotation and account for the rotation in processing the panoramic image, then the normal appearance of the panoramic image would be maintained. Such a technique is described herein.

Exemplary Panoramic Camera Device

Figure 4:
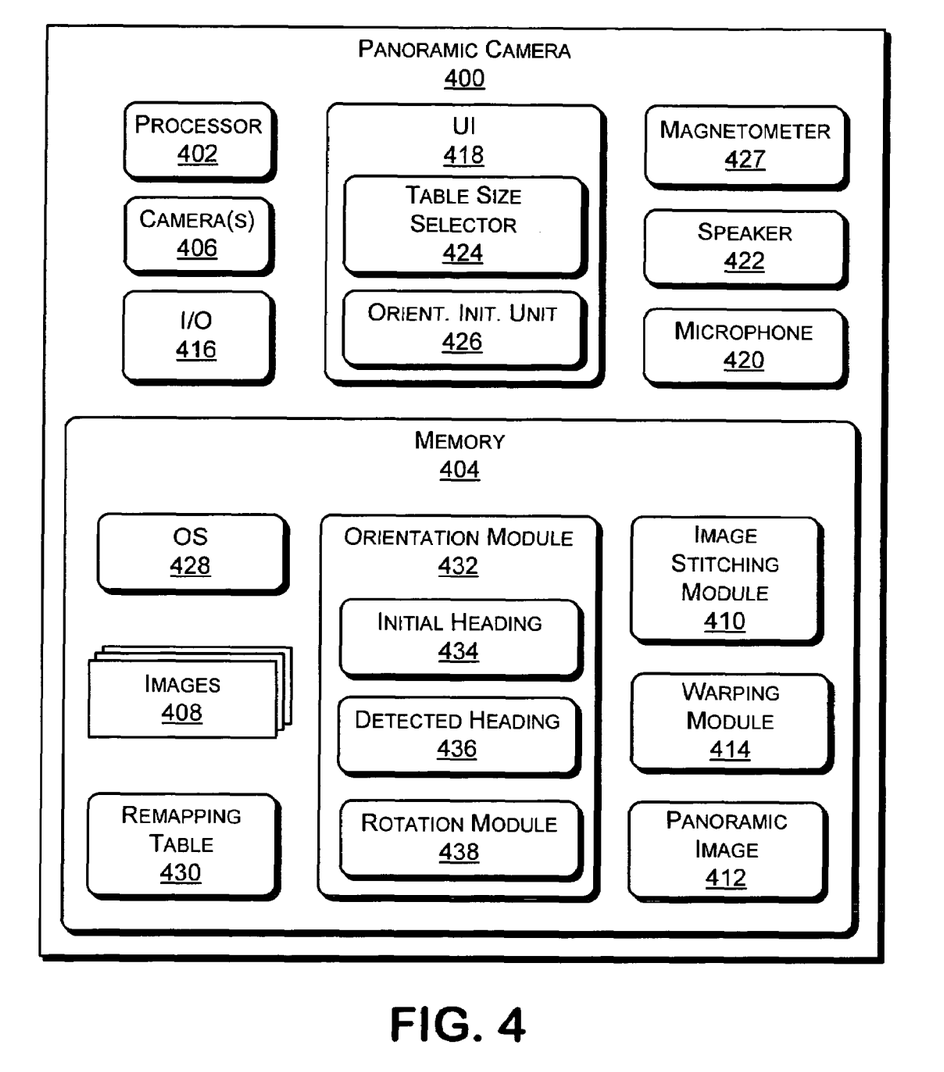
FIG. 4 is a block diagram of an exemplary panoramic camera device.

FIG. 4 is a block diagram of an exemplary panoramic camera device 400 in accordance with the present description. The exemplary panoramic camera device 400 is shown having certain elements and particular functionality is described and allocated among the certain elements. It is noted, however, that the exemplary panoramic camera device 400 may include more or fewer elements than shown and that functionality attributed to a particular element may be allocated to one or more other elements in one or more other configurations. Also, any element and/or function shown and described with respect to FIG. 4 may be implemented in hardware, software, firmware or a combination thereof regardless of how such an element and/or function is shown and described herein.

The exemplary panoramic camera device 400 includes a processor 402 and memory 404. One or more individual cameras 406 are also included in the exemplary panoramic camera device 400. The one or more individual cameras 406 are configured to image a wide-angle area (i.e. a panoramic area) if up to three hundred and sixty degrees (360°). In the following discussion, a configuration of multiple individual cameras 406 is assumed, each of the individual cameras 406 being configured to image a portion of a panoramic area. Resultant images 408 from the individual cameras 406 are stored in the memory 404 and are stitched together by an image stitching module 410 to produce a single panoramic image 412. The images may also be processed by a warping module 414 that applies a warping function to the panoramic image 412 that minimizes distortion of the panoramic image 412.

Image stitching and warping as applied to panoramic images is described in U.S. patent application Ser. No. 10/262,292 filed Sep. 30, 2003, entitled "Foveated Wide-Angle Systems and Method for Capturing and Viewing Wide-Angle Images in Real Time," by Zicheng Liu and Michael Cohen. Said application is assigned to Microsoft Corp. and is incorporated herein by reference for all that it discloses and teaches.

The exemplary panoramic camera device 400 also includes an input/output (I/O) module 416 for communicating with one or more remote devices (not shown). A user interface 418, a microphone 420 and a speaker 422 are also included in the exemplary panoramic camera device 400 to send and receive information to and from one or more users. The user interface 418 includes several interface devices (not shown) such as buttons, slider, display screens, touch screens, light emitting diodes (LEDs), and the like.

The user interface 418 also includes a table size selector 424 and an orientation initialization unit 426. The table size selector 424 is used to identify multiple table shapes and/or sizes, such as round, small rectangular (5'×10'), large rectangular (16'×5'), etc. A user selects a table size with the table size selector 424 to correspond to a table with which the exemplary panoramic camera device 400 is used. If "round" is a table shape option, it is noted that a cylindrical panorama process may be used and any computations described below for conversion to a non-cylindrical panorama may be omitted.

The table size selector 424 may also indicate a nominal orientation for each table configuration. For example, the table size selector 424 can include a diagram indicating each table size and include an identifier in the diagram that indicates how the exemplary panoramic camera device 400 should be initially oriented with respect to the table. For a rectangular table, the table size selector 424 may indicate that a front (not shown) of the camera should face a far end of the table.

The exemplary panoramic camera device 400 includes a magnetometer 427 that can detect and orientation of the exemplary panoramic camera device 400 with respect to the earth's magnetic field. Although the exemplary panoramic camera device 400 is shown having a magnetometer 427, it is noted that any device may be used that can be configured to detect a relative orientation of the exemplary panoramic camera device 400.

The memory 404 of the exemplary panoramic camera device 400 stores an operating system 428 that controls general functionality required to operate the exemplary panoramic camera device 400 and its components. A remapping table 430 and an orientation module 432 are also stored in the memory 404. The remapping table 430 contains values that are used to remap the individual images 408 to the panoramic image 412.

Remapping tables and functionality are described in U.S. patent application Ser. No. 10/177,315 entitled "A System and Method for Camera Color Calibration and Image Stitching", filed Jun. 21, 2002 by the present inventor and assigned to Microsoft Corp., the assignee of the present application. Said application which is hereby incorporated by reference for all that it teaches and discloses.

The orientation module 432 includes an initial heading 434, a detected heading 436 and a rotation module 438. The initial heading 434 is a magnetometer 427 reading that is obtained and stored when the orientation initialization unit 426 is actuated. When a user sets up the exemplary panoramic camera device 400, the user orients the camera appropriately and actuates the orientation initialization unit 426. A present heading of the exemplary panoramic camera device 400 is taken and stored at that time.

The detected heading 436 is a magnetometer 427 reading at any given time. The rotation module 438 is configured to determine a difference between the initial heading 434 and the detected heading 436 and to apply appropriate corrections to the values contained in the remapping table 430. The corrections may be applied in real time as the individual images 408 are remapped to the panoramic image 412 or the corrections may be applied to the values in the remapping table 430 to derive new values which are then stored in the remapping table.

The rotation module 438 may also be configured to apply corrections only when a threshold change in orientation has been detected. For example, if the exemplary panoramic camera device 400 is moved only say a degree or two, correction may not be desired. If the exemplary panoramic camera device 400 is rotated a significant amount—for example, ten degrees or more—then the rotation module 438 may detect the magnitude of the rotation and determine that corrections should be applied to the remapping table 430.

The orientation maintenance process is described in greater detail below, with respect to the process diagram of FIG. 6.

Figure 5:
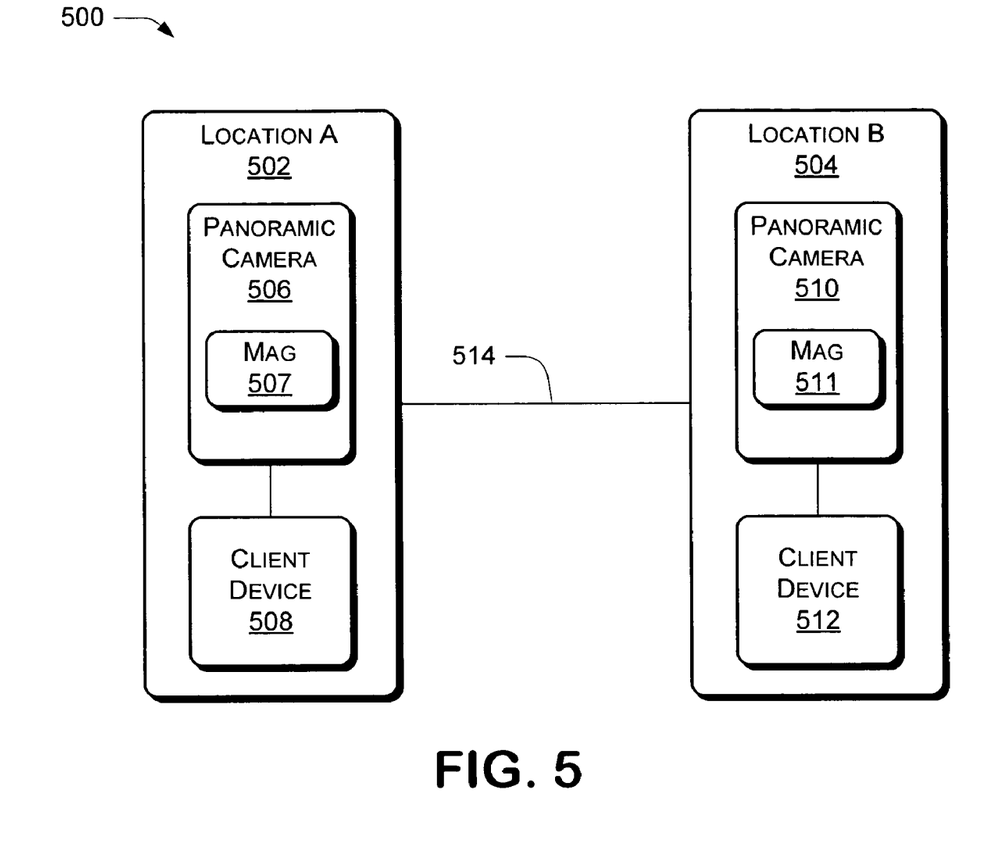
FIG. 5 is a block diagram of an exemplary panoramic camera configuration.

FIG. 5 is a block diagram of an alternative exemplary panoramic camera configuration 500. The exemplary configuration 500 shows a first location (Location A 502) and a second location (Location B 504). Location A 502 includes a panoramic camera 506 with a magnetometer 507 and a client device 508. Unlike the exemplary panoramic camera device 400 shown in FIG. 4, certain elements and functionality shown and described in FIG. 4 are included in and performed by the client device 508. The panoramic camera 506 functions to image Location A 502 and the client device 508 is configured to handle the data processing associated with the techniques described herein.

Location B 504 also includes a panoramic camera 510 with a magnetometer 511 and a client device 512. The client device 506 of Location A 502 and the client device 512 of Location B 504 communicate with each other over a communication line 514, such as a telephone line or a network such as the Internet or a local area network (LAN).

Although some elements and functionality of the panoramic camera 400 shown in FIG. 4 may be located and performed in the client devices 508, 512 of FIG. 5, it is noted that the magnetometer 427 must be included in a portion of the panoramic camera that receives object images for processing.

Exemplary Process Diagram

Figure 6:
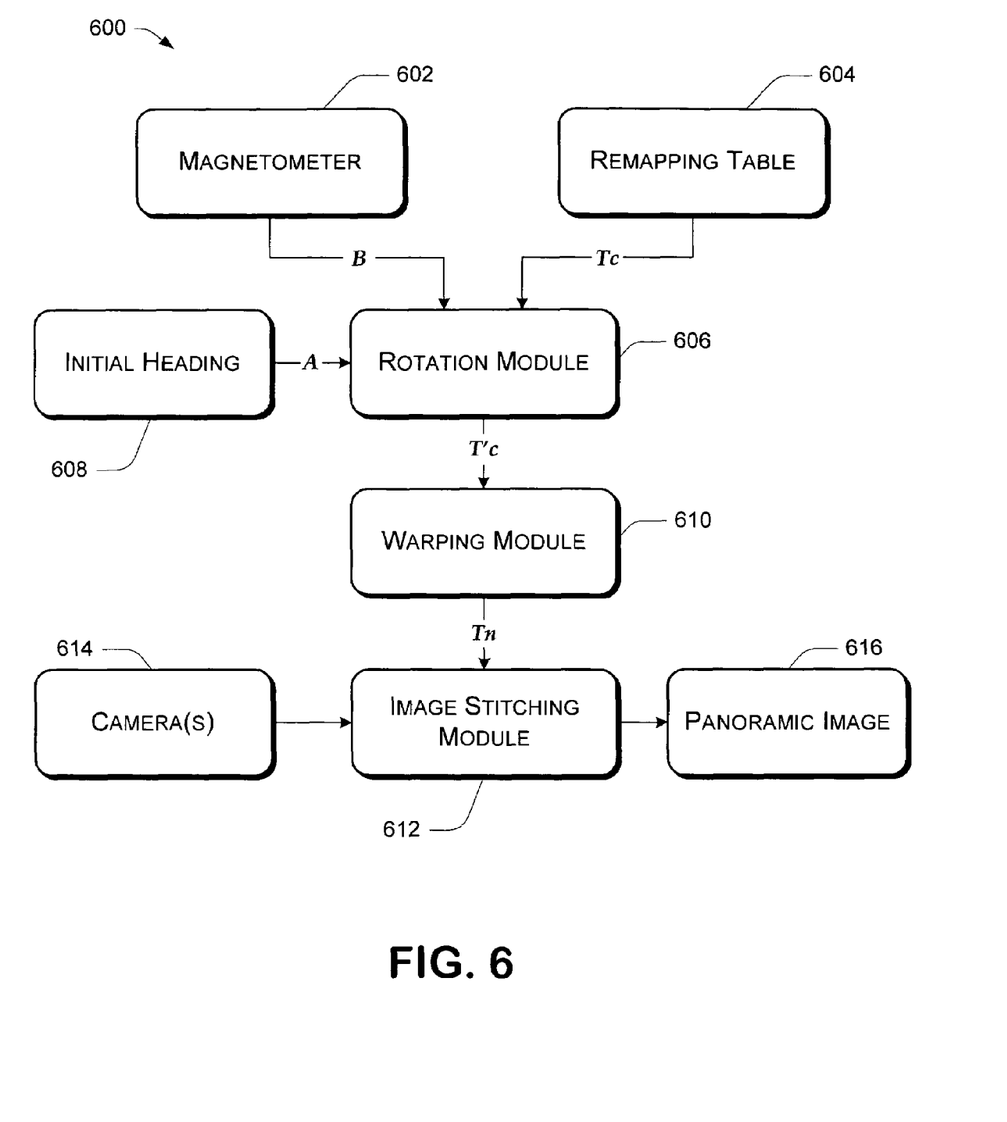
FIG. 6 is an exemplary process diagram for maintaining orientation in a panoramic camera.

FIG. 6 is depicts an exemplary process diagram 600 for maintaining orientation in a panoramic camera. In the following description of the exemplary process diagram 600, continuing reference is made to elements and reference numerals shown in previous figures.

At block 602, the magnetometer 427 provides the detected heading (B) 436 to the rotation module 438 and the rotation module 438 retrieves the initial heading (A) 434 (block 608). At block 606, the rotation module 438 determines if and how much the panoramic camera has been rotated since it was initially set up. If a rotation has occurred, the rotation module 438 applies a remapping function ($T_c$) to values in the remapping table 430 (block 604).

$T_c$ is an image remapping function that maps the images from the individual cameras to the cylindrical panoramic image. If the magnetometer reading is B, then $T_c$ can be rotated by (A–B) degrees to correct for changes in the panoramic camera orientation, yielding $T'_c$.

A non-cylindrical warping function (warping module 414) is applied to $T'_c$ at block 610, yielding a non-cylindrical warping function $T_N$. The image stitching module 410 stitches the individual images 408 from the cameras 408 (block 614) according to the corrected values at block 612. The panoramic image 412 is created at block 616.

By applying the orientation maintenance techniques described above, a panoramic image will remain in the same orientation even after a panoramic camera creating the panoramic image is rotated. The image rotation process shifts the panoramic image so that the margins of the panoramic image remain the same. For example, if a viewer is viewing the panoramic image and the panoramic camera is rotated ninety degrees, the viewer will not notice a difference since the image from the rotated camera will be rotated in an amount to offset the rotation of the camera.

Conclusion

While one or more exemplary implementations have been illustrated and described, it will be appreciated that various changes can be made therein without departing from the spirit and scope of the claims appended hereto.

The invention claimed is:

1. A 360-degree panoramic video camera system, comprising:
   one or more video cameras configured to image a panoramic area;
   a processor and memory configured to perform a process in real time, the process comprising:
      determining orientations of the panoramic video camera system;
      receiving and storing one of the orientations as an initial heading that identifies an orientation of the panoramic video camera system at an initial time;
      receiving video images from the one or more cameras, respectively, and mapping the images to panoramic video images comprising 360-degree video images of the panoramic area;
      determining a direction and magnitude of a rotation that occurs when the panoramic video camera system is rotated from the initial heading and supplying correction values to the mapping step; and
      wherein the mapping incorporates the correction values into the mapping step so that the panoramic video images maintain a similar orientation before and after the rotation such that a point in the panoramic area that is portrayed in the panoramic video images will, if displayed on a display, stay in a substantially same location on the display despite the rotations of the panoramic video camera.

2. The 360-degree panoramic video camera system as recited in claim 1, wherein the determining orientations is performed by a magnetometer that is configured to detected an orientation of the panoramic video camera system with regard to a magnetic pole.

3. The 360-degree panoramic video camera system as recited in claim 1, the process further comprising identifying a shape of a table used to support the panoramic video camera system.

4. The 360-degree panoramic video camera system as recited in claim 3, wherein the identifying the shape of the table further comprises identifying a size of the table used to support the panoramic video camera system.

5. The 360-degree panoramic video camera system as recited in claim 1, wherein the process further comprises applying a non-cylindrical warping function that normalizes sizes of objects appearing in the panoramic video images according to distances of the objects from the panoramic video camera system.

6. The 360-degree panoramic video camera system as recited in claim 1, the process further comprising orienting the panoramic video camera system in a particular way with respect to a table that supports the panoramic video camera system.

7. A method, comprising:
   receiving images from a video camera device that includes one or more individual video cameras that image a panoramic area;
   mapping the video images to panoramic space to create 360-degree panoramic video images, the mapping comprises applying a same mapping function to each video image in a set of video images that when mapped by the mapping function form a corresponding panoramic image;
   detecting a rotation of the video camera device and measuring the size of the rotation; and
   adjusting the mapping process to compensate for the detected rotation so that a point in the panoramic area that is portrayed in the panoramic video images is rendered in the panoramic video images to approximately a same display location of the panoramic space before and after the rotation, wherein in the adjusting comprises changing the mapping function based on the size of the rotation.

8. The method as recited in claim 7, wherein the detecting step further comprises:
   storing an initial heading that identifies a first orientation of the video camera device at a first time;
   receiving a detected heading that identifies a second orientation of the video camera device at a second time, the second orientation being different from the first orientation; and
   deriving a direction and magnitude of the rotation from a difference between the initial heading and the detected heading.

9. The method as recited in claim 8, further comprising receiving the initial heading and the detected heading from an orientation device that detects an orientation of the video camera device with respect to a magnetic pole.

10. The method as recited in claim 7, further comprising receiving data regarding a shape of a table on which the video camera device is situated.

11. The method as recited in claim 10, further comprising applying a non-cylindrical warping function to the panoramic video images to normalize objects according to the shape of the table on which the video camera device is situated.

12. The method as recited in claim 10, further comprising receiving data regarding a size of the table on which the video camera device is situated.

13. The method as recited in claim 7, further comprising identifying a camera device orientation that indicates a way in which the video camera device should be physically oriented.

14. One or more computer-readable media storing executable instructions that, when executed, by a processor would implement steps comprising:
  receiving an initial heading that indicates an orientation of a video camera device;
  receiving from the video camera device video images portraying a 360-degree panoramic scene;
  mapping the video images received from the video camera device to form 360-degree panoramic video images of the 360-degree panoramic scene;
  receiving a detected heading that indicates an orientation of the video camera device that is different from the orientation indicated by the initial heading; and
  computing mapping correction values that are used in the mapping process that alter the mapping process so that the panoramic video images maintain a similar orientation before and after the occurrence of the rotation, wherein a point in the 360-degree panoramic scene that is portrayed in the panoramic video images will, if displayed on a display, stay in a substantially same location on the display despite the rotations of the panoramic video camera.

15. The one or more computer-readable media as recited in claim 14, further comprising additional executable instructions that, when executed, implement an additional step of applying a non-cylindrical warping function to the panoramic video images to normalize sizes of objects appearing in the panoramic video images according to a location of each object with respect to the video camera device.

16. The one or more computer-readable media as recited in claim 15, further comprising additional executable instructions that, when executed, implement an additional step of receiving table data regarding a shape of a table on which the video camera device is situated and using the table data in the non-cylindrical warping function.

17. The one or more computer-readable media as recited in claim 16, wherein the table data further comprises data regarding a size of the table on which the video camera device is situated.

18. The one or more computer-readable media as recited in claim 14, further comprising additional executable instructions that, when executed, implement an additional step of determining a direction and magnitude of the rotation of the video camera device.

19. The one or more computer-readable media as recited in claim 14, wherein the indication of the orientation of the video camera device further comprises an indication of the orientation of the video camera device with respect to a magnetic pole of the earth.

20. A panoramic video camera comprising:
  one or more video sensors arranged to capture video images of a panoramic scene wherein their respective captured video images are processed in real time to form a stream of 360-degree panoramic video images, wherein the panoramic video camera is configured to detect rotations of the panoramic video camera, wherein the video camera uses the detected rotation changes to maintain an image orientation of 360-degree panoramic video images, wherein the 360-degree panoramic video images are rotated to compensate for the detected rotation changes such that a point in the panoramic scene that is portrayed in the panoramic video images will, if displayed on a display, stay in a substantially same location on the display despite the rotations of the panoramic video camera.

21. A panoramic video camera system according to claim 20, further comprising one or more physical sensors detecting the rotation changes.

22. A panoramic video camera system according to claim 20, wherein the panoramic video images comprise cylindrical panoramic video images.

23. A panoramic video camera system according to claim 20, wherein the video camera system has a rotation threshold value that is used to determine whether to maintain the image orientation for different detected rotations, such that rotations of a magnitude below the threshold do not have a corresponding maintenance of the image orientation and rotations of a magnitude above the threshold have a corresponding maintenance of the image orientation.

* * * * *